(12) United States Patent
Neitzel et al.

(10) Patent No.: US 7,819,590 B2
(45) Date of Patent: Oct. 26, 2010

(54) FERRULE FOR AN EVANESCENCE FIELD SENSOR LINE

(75) Inventors: Dirk Neitzel, Oldenburg (DE);
Wolfgang Waespy, Bremen (DE); Horst Kontants, Oldenburg (DE)

(73) Assignee: Leoni Automotive Leads GmbH, Brake/Unterweser (DE)

( * ) Notice: Subject to any disclaimer, the term of this patent is extended or adjusted under 35 U.S.C. 154(b) by 0 days.

(21) Appl. No.: 12/402,023

(22) Filed: Mar. 11, 2009

(65) Prior Publication Data

US 2009/0169151 A1     Jul. 2, 2009

Related U.S. Application Data

(63) Continuation of application No. PCT/EP2007/008118, filed on Sep. 18, 2007.

(30) Foreign Application Priority Data

Sep. 20, 2006   (DE) .................. 10 2006 044 042

(51) Int. Cl.
*G02B 6/36*   (2006.01)
(52) U.S. Cl. .................. 385/78; 385/53; 385/76; 385/77; 385/81
(58) Field of Classification Search .................. 385/53, 385/76, 77, 78, 81
See application file for complete search history.

(56) References Cited

U.S. PATENT DOCUMENTS 5,774,614 A  *  6/1998  Gilliland et al. ............... 385/88
6,912,912 B2     7/2005  Reichinger et al.

FOREIGN PATENT DOCUMENTS

| DE | 10131273 C1 | 12/2002 |
| DE | 10215735 A1 | 10/2003 |
| JP | 2000241661 A * | 9/2000 |
| WO | 03069294 A1 | 8/2003 |

OTHER PUBLICATIONS

German Office Action dated Aug. 21, 2007.

* cited by examiner

*Primary Examiner*—Jennifer Doan
(74) *Attorney, Agent, or Firm*—Laurence A Greenberg; Werner H Stemer; Ralph E Locher

(57) ABSTRACT

A ferrule for an evanescence field sensor line is specified that has a lower part and a correspondingly attachable upper part. The upper and lower parts respectively have a recess substantially in the shape of a half shell in such a way that in the assembled state a guide tube is formed for holding an optical wavelength in a fashion enclosing the end face. A number of geometric structures for locally fixing the optical wavelength are respectively arranged in the recesses. Furthermore, a pressure sensor having such a ferrule is specified that contains an optical wavelength configured for pressure acquisition by influencing the assigned evanescence field, and at least one optoelectronic module. The ferrule is assigned to the optoelectronic module.

8 Claims, 2 Drawing Sheets

FERRULE FOR AN EVANESCENCE FIELD SENSOR LINE

CROSS-REFERENCE TO RELATED APPLICATIONS

This is a continuation, under 35 U.S.C. §120, of copending international application No. PCT/EP2007/008118, filed Sep. 18, 2007, which designated the United States; this application also claims the priority, under 35 U.S.C. §119, of German patent application No. DE 10 2006 044 042.0, filed Sep. 20, 2006; the prior applications are herewith incorporated by reference in their entirety.

BACKGROUND OF THE INVENTION

Field of the Invention

The invention relates to a ferrule for an evanescence field sensor line, in particular for use in a pressure sensor.

Here, a ferrule is understood to be a guide element for holding an optical waveguide, in particular for the purpose of coupling light out and in.

An evanescence field sensor line for contact measurement and pressure measurement via the influencing of the external evanescence field of an optical wavelength is illustrated in international patent disclosure WO 03/069294 A1, corresponding to U.S. Pat. No. 6,912,912, by way of example. In this case, an optical waveguide that contains an optical fiber bundle with the refractive index $n1$ is introduced into an optically thinner medium with the refractive index $n2<1n$, usually into a gas that, for its part, is enclosed by an optically thicker jacket with the refractive index $n3>n2$. The optical waveguide is not coated, this also being known as cladding-free. The condition of total reflection is prescribed via the surrounding medium. The jacket bears against the optical waveguide via web-shaped geometric structures, and is thereby held at a defined spacing therefrom. The jacket therefore does not make areal contact with the optical waveguide. The light waves propagating in the uncoated optical waveguide execute multiple reflections at the interface to the surrounding medium. During a reflection, the field penetrates into the external space over a finite depth and induces the so-called evanescence field there. A disturbance of this field influences its response behavior to the medium of the optical waveguide, and thus varies the degree of the reflection in the optical waveguide, the result being that such a disturbance is betrayed by a reduction in intensity of the propagating light, and this is recorded by a signal processing unit at the end face of the optical waveguide. A disturbance of the evanescence field results, for example, whenever a pressure acting upon the jacket causes a local reduction of its spacing from the optical waveguide such that the jacket material penetrates there into the region of the evanescence field that is partially absorbed locally by the optical thickness of the material. If the spacing is further reduced by increased pressure such that the jacket finally makes areal contact locally with the optical waveguide, this can result there in a failure of the reflection if the refractive index of the jacket material is greater than that of the optical fibers of the optical waveguide, that is to say if it holds that $n3>n1$, and thus overall that the relationship $n2<n1<n3$ is valid. In this case, the recorded intensity reduction rises sharply again by comparison with small pressure effects. By contrast, the contact between the jacket and optical waveguide via holding webs is limited and constant in terms of area, and so the influence resulting therefrom on the reflective behavior in the optical waveguide can be eliminated by calibration. Particular importance attaches in general to the cladding free configuration such that the evanescence field can form in the external space.

An evanescence field sensor line is suitable, in particular, as a pressure sensor, for example in an actuator of a motor vehicle as part of an anti-trapping system.

An evanescence field sensor line of the type described, which contains an optical waveguide with a jacket spaced therefrom is sensitive because of its function to external mechanical disturbances. This disadvantageously gives rise to the problem of implementing a connection to a signal evaluation unit that is watertight and of high tensile strength and does not purely per se corrupt the sensor signal. Known ferrules, which are generally configured as core end sleeves, are best suited to sensor lines that respond only to a change in their geometry, in particular their curvature profile.

SUMMARY OF THE INVENTION

It is accordingly an object of the invention to provide a ferrule for an evanescence field sensor line, which overcomes the above-mentioned disadvantages of the heretofore-known devices of this general type. A second object of the invention is to specify a ferrule by which an evanescence field sensor line can be connected to external signal processing components such that influencing of the sensor signal can be calibrated as far as possible. A third object of the invention is to specify a pressure sensor having an optical waveguide configured for pressure acquisition by influencing the assigned evanescence field, and having an optoelectronic module, the optoelectronic module being coupled to the optical waveguide in a fashion as free from disturbance as possible.

With the foregoing and other objects in view there is provided, in accordance with the invention, a ferrule for an evanescence field sensor line. The ferrule containing a lower part and an upper part corresponding to and attached to the lower part. The upper part and the lower part each have a recess substantially in a shape of a half shell such that in an assembled state a guide tube is formed for holding an optical waveguide in a fashion enclosing an end face of the optical waveguide. A number of geometric structures for locally fixing the optical waveguide are respectively disposed in the recesses. The recesses have inner surfaces respectively configured to at least partially reflect light provided for the optical waveguide. The geometric structures are semiannular webs to constrict a cross section of the recesses or knobs and in a reflecting fashion.

The second object is achieved according to the invention by specifying a ferrule formed of an upper part and of a correspondingly attachable lower part which respectively have a recess substantially in the shape of a half shell in such a way that in the assembled state a guide tube is formed for holding an optical wavelength in a fashion enclosing the end face, in which a number of geometric structures for locally fixing the optical wavelength are respectively arranged in the recesses.

In order to minimize the extent to which the ferrule impairs the functionality of the evanescence field sensor line, the inner surfaces of the recesses, in particular including the geometric structures, of the upper part and the lower part, respectively, are configured to reflect the light provided for the optical wavelength, in particular they are silvered. At least sites that are provided for bearing against the cladding free optical waveguide are configured in a reflecting fashion. This suppresses local absorptions of the evanescence field at the inner surfaces, and the disturbance of the evanescence field is reduced to scattering effects, caused by the geometric structures, at the points of contact between the optical waveguide and the ferrule. The reflectivity can in this case be adapted in narrowband fashion to the wavelength of the light speeding through the optical waveguide. However, it is also possible to configure the ferrule with broadband reflection. A particular achievement of the reflecting configuration is that the condition of total reflection is achieved at the points of contact between the optical waveguide and the ferrule.

The particular configuration of such a silvering can be delivered, in particular, by applying a reflecting metallic layer to the inner surfaces, for example by chromium plating.

The invention proceeds in this case from the consideration that contact be made as far as possible in a locally constricted fashion with an optical waveguide provided for an evanescence field sensor line in order, in accordance with the above statements, to avoid irregular disturbances of the evanescence field that are effected by areal contacts, and thus to avoid signal influences in the neutral state. Irregular disturbances are to be understood as those that are excessively large or fluctuate with time such that they are not suitable for being calibrated out.

In order for taking account of this contact principle to fix the optical waveguide in the region of the end face provided for connection to a signal processing unit, and to render it insensitive there to external disturbing influences, a ferrule is provided that has a guide tube with internal holding structures that are configured as local geometric structures for fixing the optical waveguide. Here, up to the site where the light exits from the end face of the optical waveguide for the purpose of optoelectronic acquisition, the guide tube constitutes in the region of the end face a defined stationary environment of the optical waveguide whose influence on the optical waveguide can be calibrated. By comparison herewith, in accordance with the preceding description, the jacket of the optical waveguide is also configured according to the contact principle, but not in a stationary fashion, since it must transmit as disturbances of the evanescence field disturbances of the neutral state caused by irregular pressure effects that are to be measured.

In order to simplify mounting, the ferrule is of a bipartite configuration such that the optical waveguide is inserted into the recess, in the shape of a half shell, of a part, and the guide tube is not formed until fitting of the other part. The half shell recesses are respectively provided with a number of the geometric structures on which the optical waveguide rests in a localized fashion, in particular at points or in the shape of a line, and which define the fixing thereof in the assembled state of the two parts in the guide tube.

One or each geometric structure advantageously extends in a plane orthogonal to the longitudinal axis of the guide tube. This effectively suppresses mobility of the optical waveguide in the guide tube that would take place along the longitudinal axis. By contrast, it is desired to be able to displace the jacket of the optical waveguide in the longitudinal direction, particularly for the mounting of the evanescence field sensor line. This is achieved by a linear shaping of the holding webs in the longitudinal direction. But it is only by its connection to the ferrule that the jacket is fixed compared with the optical waveguide.

One or each geometric structure is expediently respectively configured in the recesses, in the shape of the half shell, as a semiannular web or as a knob. Whereas a knob makes contact with the optical waveguide essentially at points, two oppositely situated semiannular webs in the upper and lower part, respectively, form a fixing ring, configured to constrict the cross section, in the guide tube in the assembled state of the two parts.

In order to fulfill the holding function, it is suitable for the guide tube to have a defined length on which the geometric structures are arranged in a substantially evenly distributed fashion. The guide tube also offers a certain amount of mechanical stability at the end face.

In an expedient configuration, the upper part and the lower part are respectively provided with elements for forming a latching connection between the two parts, that is configured, in particular, for the positive connection of the two parts. Such a latching connection can, in particular, be of reversible configuration, and is distinguished by the ease with which it can be joined without the use of further holding devices, as well as by good stability characteristics which are required to fulfill the holding and fixing function of the ferrule.

The ferrule serves to connect the end face of the optical waveguide to an optoelectronic module functioning as a signal evaluation unit, while the coupling with the ferrule to such a module is preferably produced via a latching connection. Consequently, it is easily possible to position the light exit surface of the optical waveguide in a defined fashion as compared with the light-absorption surface of the optoelectronic module. There is a similar situation as to the positioning of the light input surface of the optical waveguide with the light emission surface of an optoelectronic module. Furthermore, the advantages of the latching connection correspond in a similar way to those named in the case of the connection of the two parts of the ferrule.

In a preferred configuration of the invention, the guide tube of the ferrule is configured in the assembled state as a partial tube unsupported at one end. Particularly in the case of a corresponding geometric configuration, this structure enables the partial tube to be inserted between the optical waveguide and the jacket such that the partial tube constituting one part of the guide tube takes over the holding function of the jacket at an end face. The optical waveguide is fixed while at the same time the partial tube is retained in an areal fashion by the jacket. This connection of the ferrule to the evanescence field sensor line is particularly stable.

The end of the partial tube facing the optical waveguide is hereby expediently conically tapered on the outside. This simplifies the insertion at the end face into the jacket of the optical waveguide, and/or slipping the jacket onto the partial tube, and improves the holding stability. For mounting purposes, the optical waveguide is first exposed at the end face on the length of the guide tube of the ferrule by drawing back the jacket over the optical waveguide in a longitudinal direction. The end thus exposed is then fixed in the ferrule as described above by bipartite mounting. Thereafter, the jacket is drawn onto the partial tube on the length of the unsupported part thereof, and this is easily possible owing to the conical taper of the partial tube.

In an alternative configuration of the invention, the upper part or the lower part of the ferrule is supplemented at the end facing the optical waveguide by a complete tubular segment that takes over the holding function of the jacket. It is expedient for this purpose to provide the complete tubular segment on the inside with geometric structures for making local contact with the optical waveguide that, very similar to the jacket, permit the optical waveguide to be longitudinally displaced for mounting purposes. In an assembled state of the two parts of the ferrule, the complete tubular segment appears as a part of the guide tube. A stable connection with the jacket of the optical waveguide can be produced by first pushing the jacket at least partially over the complete tubular segment or by connecting it to the segment at the end face, for example with the aid of a coating. It is also conceivable for the jacket to be allowed to butt against the complete tubular segment, and for the contact site to be sealed in a suitable way, for example to be extrusion coated.

In this alternative configuration, the inside of the complete tubular segment is preferably silvered in order to minimize the evanescence field disturbance, as explained above in the case of the guide tube.

The third object is achieved according to the invention by specifying a pressure sensor having an optical wavelength configured for pressure acquisition by influencing the assigned evanescence field, having at least one optoelectronic module, and having at least one ferrule of the above described type, which is assigned to the optoelectronic module.

The ferrule renders possible a stabilized position of the exit or entry face of the optical waveguide by comparison with the optoelectronic module so as to enable light to be coupled in or out reliably and in a lossless fashion. A particular option is to arrange the optoelectronic module in a plug part that is configured for holding the ferrule in particular by appropriate shaping and, preferably, by latching. The light exit face or the light entrance face of the optical waveguide is hereby positioned optimally facing the optoelectronic module.

In order to form the pressure sensor, the connection of the ferrule to the optical waveguide is advantageously sealed to the outside, and this acts overall in a way that protects and stabilizes the module. The seal is preferably extended to the optoelectronic module such that this region, as well, is protected and stabilized to the outside. This can be achieved, for example, by the plug part that holds the ferrule and the optoelectronic module.

The seal is expediently implemented by extrusion coating of the connection of the optical waveguide to the ferrule. Hereby, a reliable seal can be produced. The extrusion material can be a suitable plastic, for example. In particular, the plug part as a whole can be sprayed on. As an alternative, it is also possible for a prefabricated plug receptacle that holds the ferrule and the optoelectronic component to be extrusion coated for the purpose of final sealing.

In a preferred configuration of the invention, the optical waveguide is fabricated from an elastic material, for example from polyurethane. This is particularly advantageous in order to be able to deform and bend the sensor line like a cable, for example for mounting in a prescribed contour of a motor vehicle. In particular, loop-shaped lines in the case of which the light input and light exit units are grouped together sensibly have an elastically deformable optical waveguide as the core of the evanescence field sensor line. The way that the evanescence field is influenced by the stationary deformation can be calibrated. Inelastic optical waveguides are more difficult to lay and more sensitive and thus more uneconomic. Pressure effects on the sensor line can more easily damage such an optical waveguide despite elastic jacket material.

Other features which are considered as characteristic for the invention are set forth in the appended claims.

Although the invention is illustrated and described herein as embodied in a ferrule for an evanescence field sensor line, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
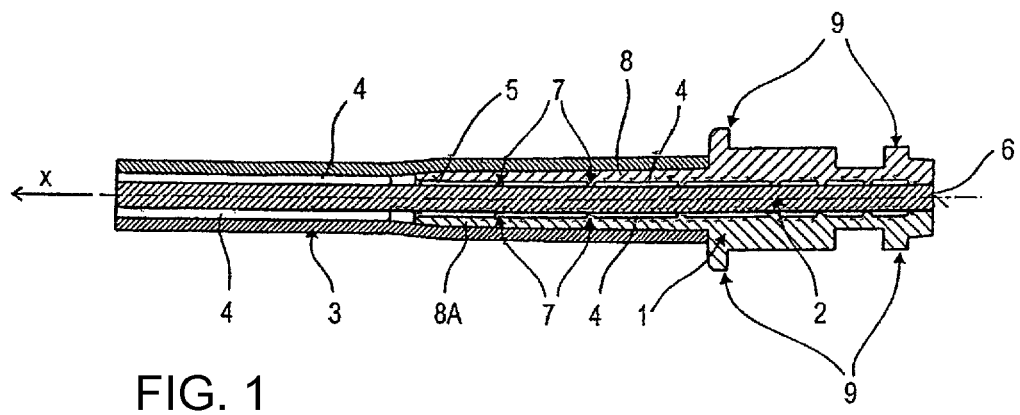
FIG. 1 is a diagrammatic, longitudinal sectional view of a ferrule in a mounted state with an end of a sensor line according to the invention.

Referring now to the figures of the drawing in detail and first, particularly, to FIG. 1 thereof, there is shown a two-shell ferrule 1 in a mounted state, with an end of a sensor line, in a longitudinal section defined by a longitudinal direction x. The ferrule 1 grips one end of a cladding free, that is to say uncoated optical waveguide 2 that is enclosed at a spacing from a jacket 3 in the region of the sensor line in front of the ferrule 1. Interspaces 4 between the optical waveguide 2 and the jacket 3 or the ferrule 1 are filled with air. In the optical waveguide 2, light propagates by total reflections at an inner boundary surface 5 of the optical waveguide as far as a light exit surface 6, during which there forms outside the optical waveguide in the interspaces 4 the so-called evanescence field whose interaction with the light field inside the optical waveguide 2 influences the reflections. The ferrule 1 has local geometric structures 7 by which the optical waveguide 2 is fixed locally. By a partial tube 8A, conically tapered at the end face, of the guide tube 8 gripping the optical waveguide 2, the ferrule 1 is inserted into the jacket 3 and retained by the latter. The ferrule 1 has a device 9 for latching in order to mount a plug part that, for example, contains an optoelectronic module.

Figure 2:
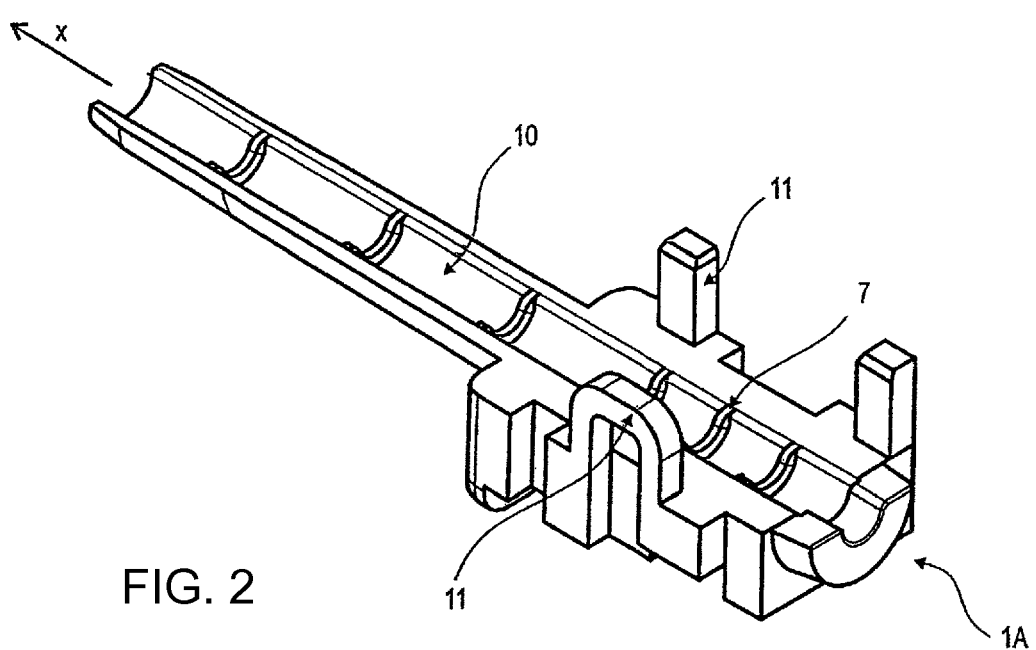
FIG. 2 is a diagrammatic, perspective view of a lower part of the ferrule according to FIG. 1.

A lower part 1A of the ferrule according to FIG. 1 is illustrated in perspective in FIG. 2. The inside of the half-shell recess 10 is visible; it is provided with the geometric structures 7 implemented as semiannular webs. The structures are orthogonal to the longitudinal direction x such that, in an assembled state, an optical waveguide that has been inserted is fixed with the upper part corresponding to the lower part 1A. The recess 10 is chromium plated together with the geometric structures 7, an absorption of the evanescence field of an optical waveguide thereby being avoided. Also to be seen is a further device 11 for latching with the upper part corresponding to the lower part 1A, from which parts the ferrule 1 is formed by assembly.

Figure 3:
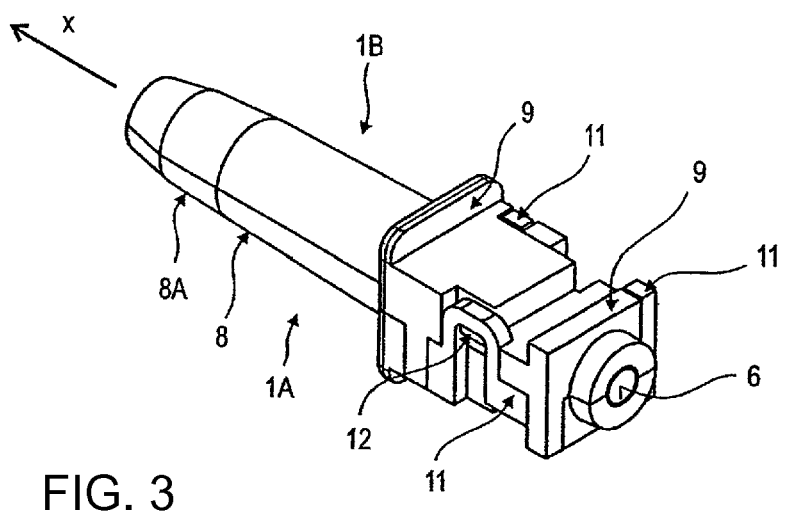
FIG. 3 is a diagrammatic, perspective view of the ferrule according to FIG. 1 in an assembled state with an optical waveguide.

FIG. 3 illustrates the ferrule 1 according to FIG. 1 in the state assembled from the associated lower part 1A and the associated upper part 1B, in a perspective identical to FIG. 2. To be seen are the light exit surface 6 of an inserted optical waveguide, the device 9 for latching for the purpose of further mounting of the ferrule 1, and the unsupported partial tube 8A of the guide tube 8 of the ferrule 1, onto which the jacket 3 of the evanescence field sensor line is drawn in the mounted state. The assembled state can be effectively discerned with the aid of the further latching devices 11 and 12, which belong respectively to the parts 1A and 1B.

Figure 4:
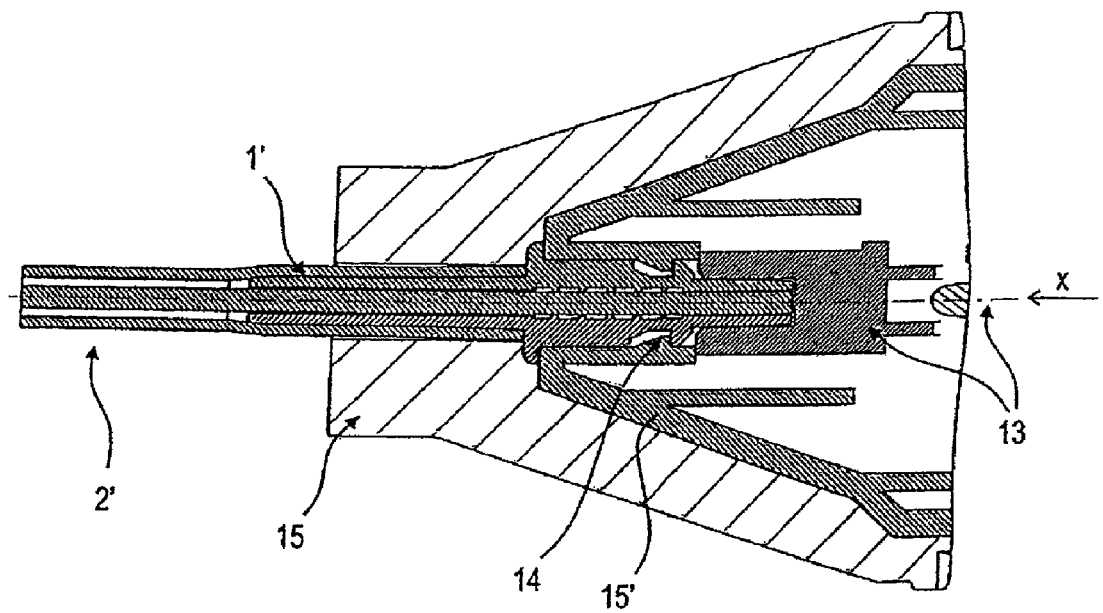
FIG. 4 is a diagrammatic, longitudinal sectional view of a further ferrule similar to that in FIG. 1, with an optoelectronic module and a sprayed on plug.

FIG. 4 shows a further ferrule 1', similar to that in FIG. 1, in the longitudinal section defined by the longitudinal direction x, with an optoelectronic module 13, which contains a light guiding element and a diode for coupling in light, and a sprayed on plug 15, in a partial view. The ferrule 1' differs from the ferrule illustrated in FIG. 1 only by the configuration of the latching device in the region 14 of the latching with the optoelectronic module. The details of the illustration of the sensor line 2' and of the ferrule 1' correspond to those in FIG. 1 in a similar way. From a sealing filled material, the plug 15 is sprayed on a prefabricated plug part 15' that positions the ferrule 1' and the optoelectronic module 13 compared to one another.

Figure 5:
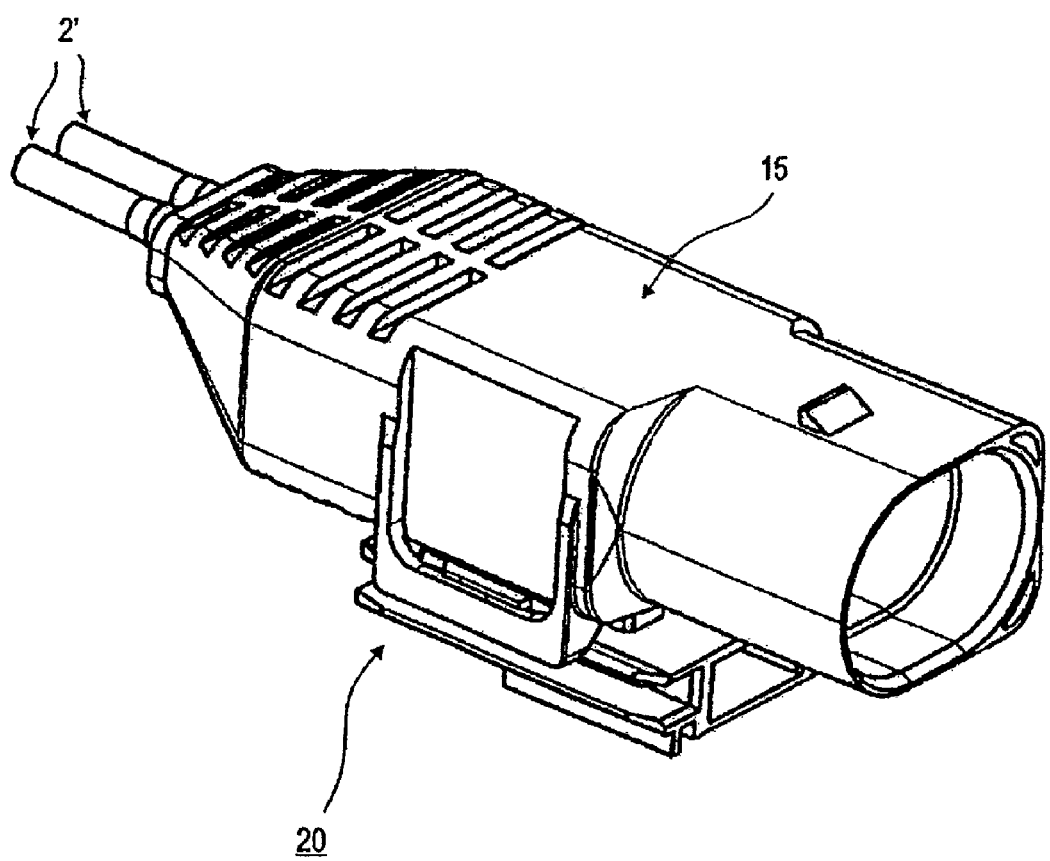
FIG. 5 is a diagrammatic, perspective view of a sprayed on plug according to FIG. 4.

FIG. 5 shows the sprayed on (injected molded) plug 15 according to FIG. 4 in a perspective illustration. The plug is implemented for a loop-laid evanescence field sensor line or sensor line 2', and contains in an output and in an input two ferrules that respectively hold the starting face and the end face of the associated optical waveguide. The module shown forms a pressure sensor 20 overall.

The latching devices can be form-locking connections. A form-locking connection is one that connects two elements together due to the shape of the elements themselves, as opposed to a force-locking connection, which locks the elements together by force external to the elements.

The invention claimed is:

1. A pressure sensor, comprising:
    an optical wavelength for pressure acquisition by means of influencing an assigned evanescence field and having an end face;
    at least one optoelectronic module; and
    at least one ferrule assigned to said optoelectronic module, said ferrule containing:
        a lower part;
        an upper part corresponding to and attached to said lower part, said upper part and said said lower part each having a recess formed therein substantially in a shape of a half shell such that in an assembled state a guide tube is formed for holding said optical waveguide in a fashion enclosing said end face; and
        a number of geometric structures for locally fixing said optical waveguide are respectively disposed in said recesses, said recesses having inner surfaces respectively configured to at least partially reflect light provided for said optical waveguide, said geometric structures being one of semiannular webs to constrict a cross section of said recesses and knobs and in a reflecting fashion.

2. The pressure sensor according to claim 1, further comprising a plug part for holding said ferrule, said optoelectronic module disposed in said plug part.

3. The pressure sensor according to claim 1, wherein a connection of said ferrule to said optical wavelength is sealed to an outside.

4. The pressure sensor according to claim 1, wherein a connection of said ferrule to said optical wavelength is extrusion coated.

5. The pressure sensor according to claim 1, wherein said optical wavelength is formed from an elastic and transparent material.

6. The pressure sensor according to claim 1, wherein said optical wavelength is formed from polyurethane.

7. The pressure sensor according to claim 2, wherein said plug part is shaped for holding said ferrule.

8. The pressure sensor according to claim 2, wherein said plug part latches said ferrule.

* * * * *